United States Patent
Reed

(10) Patent No.: US 10,248,129 B2
(45) Date of Patent: Apr. 2, 2019

(54) PITCH COMPENSATION FOR AUTONOMOUS VEHICLES

(71) Applicant: GM GLOBAL TECHNOLOGY OPERATIONS LLC, Detroit, MI (US)

(72) Inventor: Brooks Reed, San Francisco, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 87 days.

(21) Appl. No.: 15/491,649

(22) Filed: Apr. 19, 2017

(65) Prior Publication Data

US 2018/0307236 A1 Oct. 25, 2018

(51) Int. Cl.
| | | |
|---|---|---|
| *G05D 1/02* | (2006.01) | |
| *G05D 1/00* | (2006.01) | |
| *B60W 40/076* | (2012.01) | |
| *B60W 40/107* | (2012.01) | |
| *B60W 40/11* | (2012.01) | |

(Continued)

(52) U.S. Cl.
CPC ........... *G05D 1/0223* (2013.01); *B60W 10/18* (2013.01); *B60W 10/20* (2013.01); *B60W 40/076* (2013.01); *B60W 40/107* (2013.01); *B60W 40/11* (2013.01); *G05D 1/0088* (2013.01); *B60W 2520/105* (2013.01); *B60W 2520/16* (2013.01); *B60W 2550/142* (2013.01); *B60W 2550/408* (2013.01); *B60W 2710/18* (2013.01); *B60W 2710/20* (2013.01); *B60W 2720/106* (2013.01); *B60W 2750/40* (2013.01); *G01S 19/13* (2013.01); *H04L 67/12* (2013.01); *H04W 84/042* (2013.01); *H04W 84/12* (2013.01)

(58) Field of Classification Search
CPC ... G05D 1/0223; G05D 1/0088; B60W 10/20; B60W 10/18; B60W 40/11; B60W 40/107; B60W 40/076; B60W 2520/16; B60W 2550/142; B60W 2520/105; B60W 2750/40; B60W 2720/106; B60W 2710/20; B60W 2710/18; B60W 2550/408; G08G 1/096791; H04L 67/12; H04W 84/042; H04W 84/12; G01S 19/13
See application file for complete search history.

(56) References Cited

U.S. PATENT DOCUMENTS

2008/0243389 A1* 10/2008 Inoue ..................... G08G 1/165
  701/301
2018/0057003 A1* 3/2018 Hyun .................. B60W 30/162

OTHER PUBLICATIONS

Optimization for Machine Learning, The MIT Press, Cambridge, Massachusetts and London, England.

(Continued)

*Primary Examiner* — Genna M Mott
(74) *Attorney, Agent, or Firm* — Lorenz & Kopf, LLP

(57) ABSTRACT

Systems and method are provided for controlling a vehicle. In one embodiment, a method includes: determining, by a controller onboard the vehicle, a lateral plan for the operating vehicle along a route; obtaining, by the controller, pitch data pertaining to the lateral plan; and determining, by the controller, a longitudinal plan for operating the vehicle along the route based on the pitch data and the lateral plan, wherein the pitch data influences a planned rate of longitudinal movement of the vehicle at one or more points along the lateral plan. In this regard, the planned vehicle velocity or acceleration at a point in the future may be constrained by pitch data corresponding to the expected vehicle location at that point in the future.

17 Claims, 5 Drawing Sheets

(51) Int. Cl.
*B60W 10/18* (2012.01)
*B60W 10/20* (2006.01)
*H04W 84/12* (2009.01)
*H04W 84/04* (2009.01)
*G01S 19/13* (2010.01)
*H04L 29/08* (2006.01)

(56) References Cited

OTHER PUBLICATIONS

Kristin P. Bennett, Emilio Parrado-Hernandez, The Interplay of Optimization and Machine Learning Research, Journal of Machine Learning Research 7 (2006) 1265-1281, Jul. 2006.

John Schulman, Yan Duan, Jonathan Ho, Alex Lee, Ibrahim Awwal, Henry Bradlow, Jia Pan, Sachin Patil, Ken Goldberg, Pieter Abbeel, Motion Planning with Sequential Convex Optimization and Convex Collision Checking, Department of Electrical Engineering and Computer Sciences, University of California at Berkeley, USA, vol. 33, Issue 9, Article first published online Jun. 11, 2014; Issue published: Aug. 1, 2014.

* cited by examiner

PITCH COMPENSATION FOR AUTONOMOUS VEHICLES

TECHNICAL FIELD

The present disclosure generally relates to autonomous vehicles, and more particularly relates to systems and methods for providing adjustments or compensation for road pitch when controlling an autonomous vehicle.

BACKGROUND

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

With traditional manually-controlled vehicles, the vehicle operator is capable of perceiving upcoming road conditions and proactively adjusting the vehicle speed or acceleration to account for the anticipated changes resulting from the upcoming road conditions. Additionally, when the vehicle operator is unable to perceive upcoming road conditions, for example, at the crest of a hill, the vehicle operator can also adjust vehicle speed or acceleration to account for potentially unknown road conditions. However, automated vehicles operating in a fully autonomous mode may lack the ability to proactively account for upcoming road conditions, which may impair ride quality and degrade some aspects of the autonomous control.

Accordingly, it is desirable to provide systems and methods that allow automated vehicles to account for upcoming road conditions in a manner that improves control and ride quality. Furthermore, other desirable features and characteristics of the present invention will become apparent from the subsequent detailed description and the appended claims, taken in conjunction with the accompanying drawings and the foregoing technical field and background.

SUMMARY

Systems and method are provided for controlling a vehicle. In one embodiment, a method includes: determining, by a controller onboard the vehicle, a lateral plan for operating the vehicle along a route; obtaining, by the controller, pitch data pertaining to the lateral plan; and determining, by the controller, a longitudinal plan for operating the vehicle along the route based on the pitch data and the lateral plan, wherein the pitch data influences a planned rate of longitudinal movement of the vehicle at one or more points along the lateral plan.

In another embodiment, an autonomous vehicle includes: at least one sensor that provides sensor data; one or more actuators onboard the vehicle; and a controller that, by a processor and based on the sensor data, identifies a current vehicle pose, determines object prediction data for an object based at least in part on the sensor data, determines a lateral plan for operating the vehicle along a route based at least in part on the current vehicle pose and the object prediction data, determines a longitudinal plan for operating the vehicle along the route based at least in part on the lateral plan and pitch data corresponding to the lateral plan, and autonomously operates the one or more actuators onboard the vehicle in accordance with the longitudinal plan, wherein the pitch data influences a planned rate of vehicle movement at one or more points in the future along the lateral plan.

In another embodiment, a method of controlling a vehicle includes: identifying, by a controller onboard the vehicle, a current pose of the vehicle; determining, by the controller, object prediction data based at least in part on sensor data from a sensing device onboard the vehicle; determining, by the controller, a lateral plan for operating the vehicle along a route from the current pose based at least in part on the object prediction data; obtaining, by the controller, pitch data pertaining to the lateral plan; determining, by the controller, one or more longitudinal constraints at a planned location along the lateral plan based at least in part on a subset of the pitch data corresponding to the planned location; determining, by the controller, a longitudinal plan for operating the vehicle along the route based on the lateral plan, wherein the one or more longitudinal constraints influences a planned rate of longitudinal movement of the vehicle at a future time corresponding to the planned location; and autonomously operating, by the controller, one or more actuators onboard the vehicle in accordance with the longitudinal plan.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
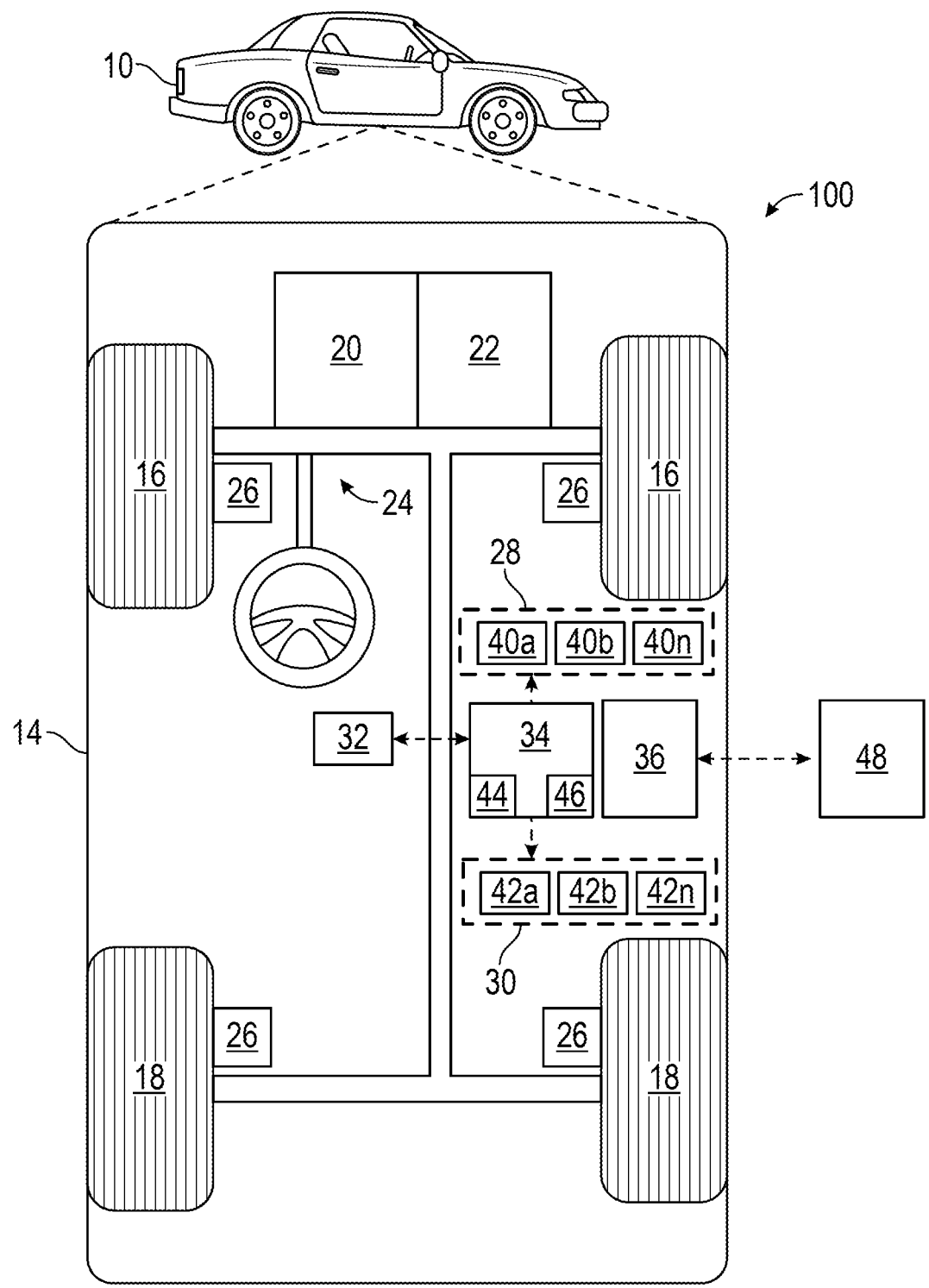
FIG. 1 is a functional block diagram illustrating an autonomous vehicle having a ride control system, in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

In one or more exemplary embodiments described herein, information or data about the pitch, slope, or angle of the roadway at various locations along a route is utilized to calculate or otherwise determine velocity or acceleration limits at those locations, which, in turn, are utilized when determining a motion plan for autonomously operating a vehicle along the route. For example, based on the road pitch at a particular location, the planned velocity or acceleration at that location along the route may be limited to maintain a vertical acceleration or gravitational force (g-force) normal to the roadway surface at that location that is less than or equal to a threshold value to achieve a desired level of passenger comfort (e.g., at the crest or trough of a hill). Similarly, the road pitch may be utilized to determine acceleration or deceleration limits at locations along the route to achieve a desired level of passenger comfort (e.g., by avoiding unnecessary or unnatural vehicle accelerations while traveling downhill, unnecessary decelerations while traveling uphill, and the like) or to account for practical vehicle capabilities (e.g., when vehicle acceleration is limited traveling uphill, when vehicle deceleration is limited traveling downhill, and the like).

Additionally, the road pitch may be utilized to further limit the planned velocity or acceleration to account for the impact of the road pitch on sensor range or obstacle detection (e.g., when onboard sensors cannot sense beyond a crest or trough of a hill based on the vehicle inclination). Thus, the magnitude or likelihood of decelerations attributable to new obstacles or objects that are not sensed until they are relatively closer to the vehicle due to roadway pitch may be reduced.

As a result of the roadway pitch adjustments described herein, the vehicle velocity and acceleration may be smoothed and constrained in a manner that is intuitive to passengers or vehicle occupants, and thereby, the perceived ride quality may be improved. The quality of the vehicle control may also be improved by accounting for the effects of roadway pitch on vehicle capabilities, thereby minimizing deviations from planned velocities and accelerations. Additionally, accounting for varying effective sensor capabilities may also limit variations in planned velocities and accelerations which could otherwise be attributable to spurious variations in object data caused by roadway pitch influencing sensor data from onboard sensing devices.

While the subject matter may be described herein primarily in the context of using a map database, mapping data, survey data, or the like to obtain roadway pitch data corresponding to future locations along the planned route of a vehicle, the subject matter described herein is not necessarily limited to mapped pitch data. For example, in various embodiments, future roadway pitch data may be obtained from or otherwise determined using one or more devices onboard the vehicle, such as, for example, cameras or other imaging sensors, radar, lidar, or other ranging devices, inertial measurement units (IMUS) or other inertial sensors onboard the vehicle, and the like. Additionally, in various embodiments, future roadway pitch data may be calculated or determined by blending, fusing, or otherwise augmenting pitch data derived from mapping data with sensed pitch data determined using onboard devices. Accordingly, the subject matter described herein is not intended to be limited to any particular source of roadway pitch data for future locations in advance of a current vehicle location along a planned route of travel.

With reference to FIG. 1, an autonomous vehicle control system shown generally at 100 is associated with a vehicle 10 in accordance with various embodiments. In general, the control system 100 determines a motion plan for autonomously operating the vehicle 10 along a route in accordance with roadway pitch information. In this regard, the roadway pitch information influences the rate at which the vehicle 10 moves longitudinally while traversing the route, which, in turn influences the ride experienced by the occupant, as described in greater detail below primarily in the context of FIGS. 4-5.

As depicted in FIG. 1, the vehicle 10 generally includes a chassis, a body 14, front wheels 16, and rear wheels 18. The body 14 is arranged on the chassis and substantially encloses components of the vehicle 10. The body 14 and the chassis may jointly form a frame. The wheels 16-18 are each rotationally coupled to the chassis near a respective corner of the body 14.

In various embodiments, the vehicle 10 is an autonomous vehicle and the ride control system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the ride control system 100 and, when executed by the processor 44, cause the processor 44 to calculate, determine, or otherwise generate a motion plan for operating the vehicle 10 that accounts for the pitch or changes in elevation of the portion of the roadway encompassed by the plan. For example, as described in greater detail below in the context of FIGS. 4-5, the instructions may cause the processor 44 to obtain, either from onboard memory 32 or another entity 48 (e.g., a networked map database), elevation and/or pitch data for a route portion in front of the current vehicle position, and then utilize the elevation and pitch data to derive velocity or acceleration limits to be used when determining the motion plan.

In one or more embodiments, the processor 44 obtains data or information that characterizes the performance or capabilities of one or more onboard sensing devices 40a-40n, and using the elevation changes and roadway pitch at various locations along the route portion, the processor 44 determines the effective range of one or more respective sensing devices 40a-40n based on the relationship between the sensor field of view and the inclination or angle of the roadway. Based on the effective sensor range at a particular location, the processor 44 calculates a velocity limit associated with that location that accounts for changes in the sensing capabilities. Thus, when the roadway pitch and elevation changes decrease the effective range or sensing distance of a sensing device at a particular location, the velocity may be limited in a corresponding manner to account for the potential uncertainty beyond the sensor range at that location. This may, for example, cause the velocity of the vehicle 10 to be reduce at the crest or trough of a relatively steep hill, which may not only increase passenger comfort but reduce the likelihood of any subsequent abrupt maneuvers due to object or obstacles that are likely to be outside the sensor range at such locations.

As another example, in one or more embodiments, the processor 44 calculates or otherwise determines the derivative of the roadway pitch along the route, and then utilizes the derivative of the roadway pitch to determine a velocity limit at locations along the route to maintain acceleration experienced by vehicle occupants in the vertical direction normal to the roadway surface less than or equal to a maximum vertical acceleration value. In this regard, the centripetal acceleration formula $a_{max}=v^2/r$ may be utilized, where the derivative of the roadway pitch corresponds to the term 1/r in the vertical plane at a particular location along the route and $a_{max}$ is the maximum vertical acceleration value being imposed.

As yet another example, in one or more embodiments, the processor 44 calculates or otherwise determines the component of gravity that impacts the vehicle 10 longitudinally based on the roadway pitch at a particular location along the route and adjusts the vehicle acceleration limits associated with that location based on the roadway pitch. For example, the longitudinal component of gravitational acceleration may be determined by multiplication using an adjustment factor equal to the sine of the roadway pitch angle, which, in turn may be utilized to shift the range of achievable accelerations of the vehicle 10 at that particular location along the route by subtracting the gravitational component from the endpoints of the range. Thus, for an incline, the longitudinal gravitational acceleration component decreases the maximum forward vehicle acceleration in the positive longitudinal direction and similarly increases the maximum vehicle deceleration in the negative longitudinal direction (e.g., by making the magnitude more negative).

Using the pitch-based velocity and acceleration limits, a solution for controlling the vehicle 10 longitudinally may be determined that accounts for passenger comfort, variations in sensor range attributable to changes in roadway pitch, and the realizable vehicle acceleration capabilities as influenced by gravity. As a result, the autonomously-controlled longitudinal travel of the vehicle 10 may better emulate or approximate a human driver.

Figure 2:
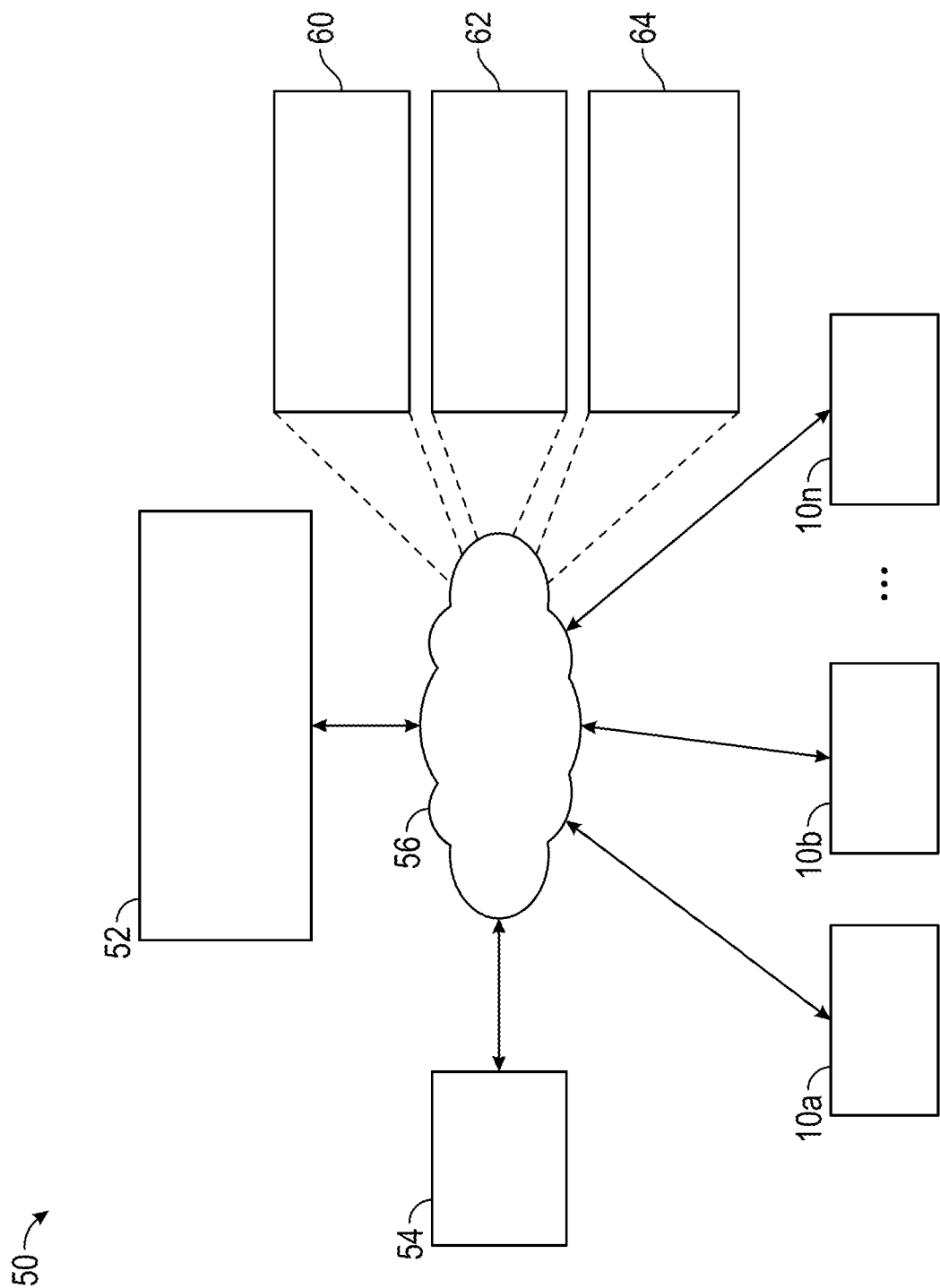
FIG. 2 is a functional block diagram illustrating a transportation system having one or more autonomous vehicles of FIG. 1, in accordance with various embodiments.

Still referring to FIG. 1, in exemplary embodiments, the communication system 36 is configured to wirelessly communicate information to and from other entities 48, such as but not limited to, other vehicles ("V2V" communication) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system 52 that is associated with one or more instances of autonomous vehicles 10*a*-10*n* as described with regard to FIG. 1. In various embodiments, the operating environment 50 further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10*a*-10*n*. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and the autonomous vehicles 10*a*-10*n* to schedule rides, dispatch autonomous vehicles 10*a*-10*n*, and the like. In various embodiments, the remote transportation system 52 stores store account information such as subscriber authentication information, vehicle identifiers, profile records, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10*a*-10*n* (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
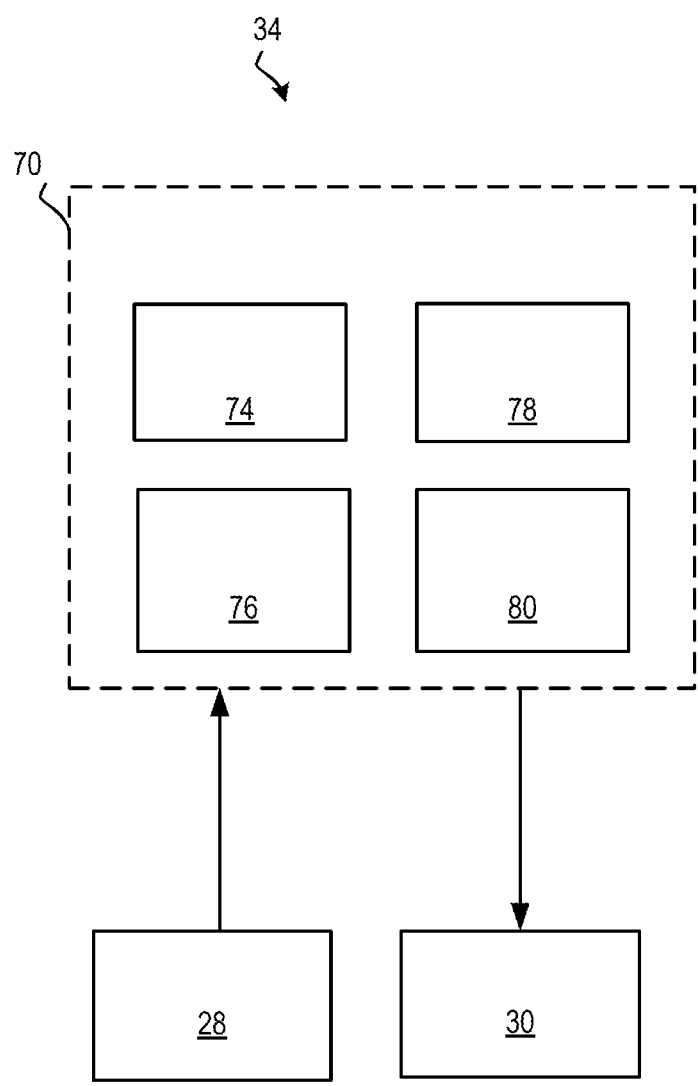
FIG. 3 is a schematic block diagram of an automated driving system (ADS) for a vehicle in accordance with one or more exemplary embodiments.

In accordance with various embodiments, controller 34 implements an autonomous driving system (ADS) 70 as shown in FIG. 3. That is, suitable software and/or hardware components of controller 34 (e.g., processor 44 and computer-readable storage device 46) are utilized to provide an autonomous driving system 70 that is used in conjunction with vehicle 10, for example, to automatically control various actuators 30 onboard the vehicle 10 to thereby control vehicle acceleration, steering, and braking, respectively, without human intervention.

In various embodiments, the instructions of the autonomous driving system 70 may be organized by function or system. For example, as shown in FIG. 3, the autonomous driving system 70 can include a sensor fusion system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the sensor fusion system 74 synthesizes and processes sensor data and predicts the presence, location, classification, and/or path of objects and features of the environment of the vehicle 10. In various embodiments, the sensor fusion system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

As described in greater detail below in the context of FIGS. 4-5, in exemplary embodiments, the ADS 70 determines a lateral path command for controlling the steering or lateral position of the vehicle 10 along a route and a longitudinal path command for controlling the longitudinal position, the velocity and/or the acceleration of the vehicle 10 along the route in concert with the lateral path command. In embodiments described herein, the longitudinal path command incorporates compensation or adjustments that account for the roadway pitch (or variations thereof) at future points along the route and limit the planned velocity and/or acceleration of the vehicle 10. For example, the planned velocity may be limited to maintain the vertical acceleration component normal to the roadway surface that the vehicle 10 is subjected to within prescribed limits based on passenger comfort, vehicle clearance or other physical capabilities, and the like. Additionally, the planned velocity or acceleration may be limited to account for effective sensor blind spots when the distance of the future roadway encompassed by the sensor range decreases due to roadway pitch variations. Lastly, the planned vehicle acceleration at future points may be constrained to what is physically achievable based on gravitational forces and the inclination or declination of the roadway at those points in the future, thereby ensuring that the longitudinal path command is actually realizable by the vehicle 10. By accounting for future roadway pitch in advance, the ride quality and the longitudinal control of the vehicle 10 may be improved.

In various embodiments, the controller 34 implements machine learning techniques to assist the functionality of the controller 34, such as feature detection/classification, obstruction mitigation, route traversal, mapping, sensor integration, ground-truth determination, and the like.

Figure 4:
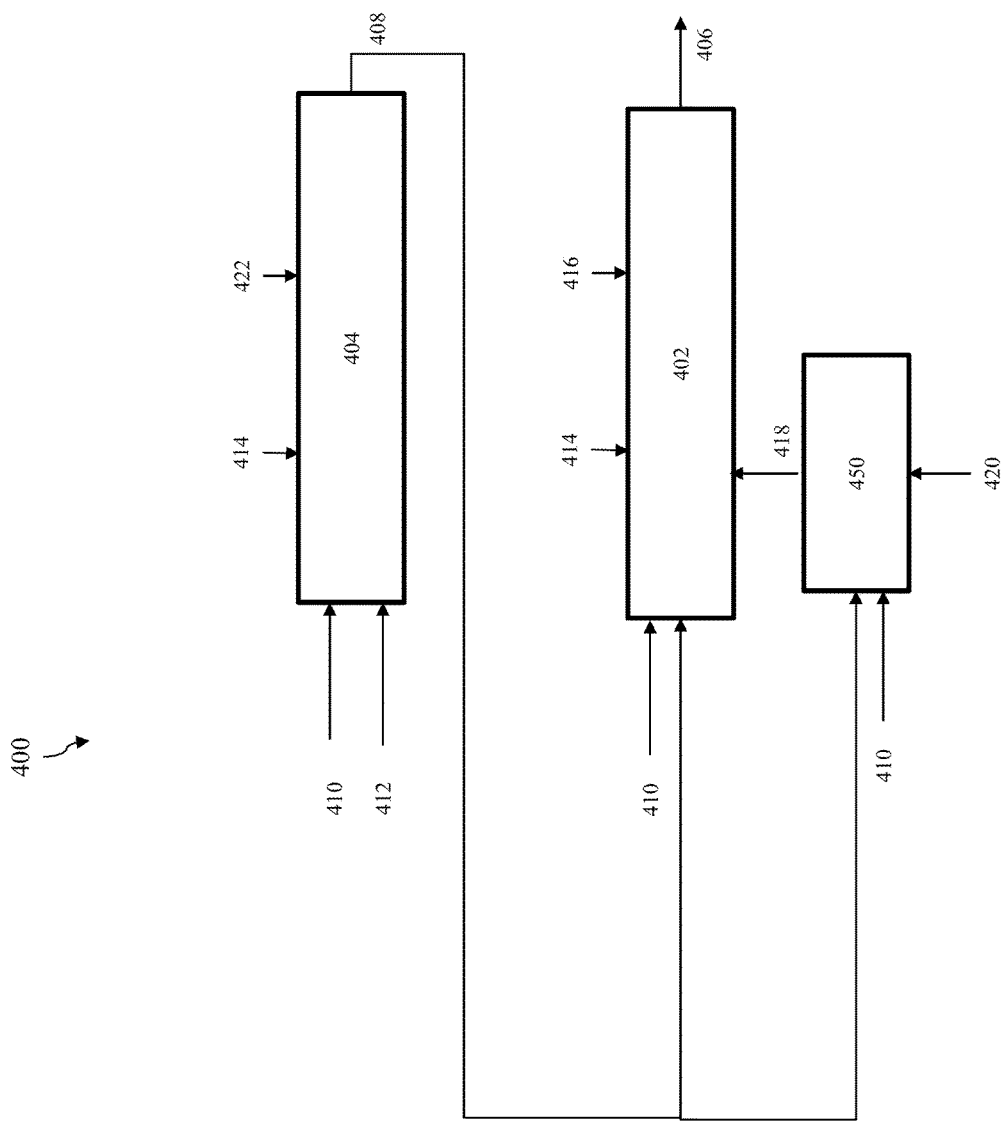
FIG. 4 is a block diagram of a motion planning module for a vehicle in accordance with one or more exemplary embodiments.

FIG. 4 depicts a motion planning module 400 suitable for use with a vehicle to generate a motion plan for controlling the vehicle as it traverses along a route, such as, for example, as part of a guidance system 78 in an ADS 70 implemented by a control module (e.g., controller 34 or processor 44) in the vehicle 10 of FIG. 1. The motion planning module 400 includes a longitudinal solver module 402 that generates a longitudinal motion plan output 406 for controlling the movement of the vehicle along the route in the general direction of travel, for example, by causing the vehicle to accelerate or decelerate at one or more locations in the future along the route. The motion planning module 400 also includes a lateral solver module 404 that generates a lateral motion plan output 408 for controlling the lateral movement of the vehicle along the route to alter the general direction of travel, for example, by steering the vehicle at one or more locations in the future along the route. The longitudinal and lateral plan outputs 406, 408 may be subsequently provided to lower level control modules that control controlling the vehicle actuators 30 to achieve movement of the vehicle 10 along the route that corresponds to the longitudinal and lateral plans 406, 408.

As described above, in exemplary embodiments, the solver modules 402, 404 optimize a map of car vehicle trajectories. In one embodiment, the longitudinal solver module 402 optimizes the acceleration of the vehicle, and thereby the speed (or velocity) and position of the vehicle in the general direction of travel (e.g., the forward direction aligned with the longitudinal axis of the vehicle), resulting in a longitudinal travel plan 406 that characterizes the vehicle speed as a function of time along a lateral path (e.g., the lateral travel plan 408), as described in greater detail below. In one embodiment, the lateral solver module 404 optimizes the derivative of the curvature of the lateral path based on deviations about a linearization corresponding to a lane of travel, with the derivative of curvature being mapped to a corresponding steering angle (and a corresponding rate of change of the steering angle) for the vehicle by modeling the vehicle behavior using velocity, acceleration, and potentially other factors. Accordingly, the resulting lateral travel plan 408 is a path in space (e.g., a sequence of spatial coordinates) that defines the vehicle position in the lateral direction perpendicular to the longitudinal direction of travel that avoids obstacles while also satisfying other lateral constraints, as described in greater detail below.

In exemplary embodiments, the lateral solver module 404 receives or otherwise obtains the current or instantaneous pose 410 of the vehicle, which includes the current position or location of the vehicle, the current orientation of the vehicle, and the current speed or velocity of the vehicle. The current vehicle pose 410 may also include previously output longitudinal and lateral plans 406, 408 from a preceding solution that provide the currently planned future positions or locations of the vehicle along the route and currently planned future speeds or velocities at instances in the future. Using the current vehicle pose 410, the lateral solver module 404 also retrieves or otherwise obtains lateral route information 412 which includes information about the route the vehicle is traveling along to reach a destination from the current pose 410 that encompasses some additional forward travel distance into the future (the lateral prediction horizon) based on the current vehicle velocity. The lateral route information 412 may include, for example, the current and future road curvature, current and future lane information (e.g., lane types, boundaries, and other constraints or restrictions), as well as other constraints or restrictions associated with the roadway (e.g., minimum and maximum speed limits, height or weight restrictions, and the like). The lateral route information 412 may be obtained from an onboard data storage element 32, from an online database, or from another entity.

The lateral solver module 404 also receives or otherwise obtains the current obstacle data 414 relevant to the route and current pose of the vehicle, which may include both current and predicted values for any objects or obstacles in a vicinity of the vehicle or the future route, such as, for example, the location or position, size, orientation or heading, speed, acceleration, and other object characteristics. The lateral solver module 404 also receives or otherwise obtains lateral constraint data 422 which characterizes or otherwise defines the kinematic or physical capabilities of the vehicle for lateral movement, such as, for example, the maximum steering angle or range of steering angles, the maximum rate of change for the steering angle, and the like. The lateral constraint data 422 may also be specific to each particular vehicle and may be obtained from an onboard data storage element 32 or from a networked database or other entity 48, 52, 54. The lateral vehicle constraint data 422 may also include other constraints imposed based on safety, passenger comfort or preferences, or other concerns, such as, for example, limits on the lateral velocity or acceleration of the vehicle 10, the rate of change for the steering angle and the derivative thereof (e.g., the acceleration of the steering angle), minimum lateral separation distances or buffers for obstacles or lane boundaries, lane preferences, and the like.

Using the various inputs 410, 412, 414, 422, the lateral solver module 404 determines a lateral travel plan solution within the lateral prediction horizon. In this regard, the lateral solver module 404 uses the planned route, lane information, the obstacle information, and current vehicle pose to derive a lateral path that minimizes or otherwise optimizes a cost variable (or a combination of cost variables) without violating the lateral constraints 422 (e.g., so that the planned lateral path does not call for sharp turns or maneuvers the vehicle is not physically capable of executing). For example, the lateral solver module 404 may attempt to minimize travel time, minimize fuel consumption, minimize lateral accelerations (or derivative of curvature or jerk), or achieve some optimal combination of travel time, fuel consumption, obstacle separation distances, and potentially other variables according to predefined weightings assigned to those cost variables. The resulting lateral path command 408 output by the lateral solver module 404 is a sequence of vehicle position coordinates, vehicle heading, and curvature of the route the vehicle is to travel discretized spatially for the lateral prediction horizon distance ahead of the current vehicle position, where the lateral prediction horizon distance is a function of the current vehicle velocity.

Still referring to FIG. 4, the longitudinal solver module 402 receives or otherwise obtains the planned lateral path 408 from the lateral solver module 404, the current vehicle pose 410, and the obstacle data 414 and determines a solution 406 for traveling along the planned lateral path 408 within a longitudinal prediction horizon that complies with longitudinal constraints 416, 418. In exemplary embodiments, the longitudinal solver module 402 uses longitudinal constraints 416 that are independent of roadway pitch along with pitch-based constraints 418 that account for changes or variations in the roadway pitch along the lateral path 408. In this regard, when the longitudinal constraints 416, 418 for a particular longitudinal parameter are different, the longitudinal solver module 402 may attempt to comply with the more restrictive of the constraints. For example, when pitch-based velocity constraint 418 imposes a maximum velocity limit (e.g., due to decreased effective sensor range, passenger comfort, or the like) at a point along the lateral path 408 that is less than other velocity constraints 416, the longitudinal solver module 402 attempts to derive a longitudinal path solution 406 that complies with the pitch-based velocity constraint 418 at that point within the lateral path 408. In exemplary embodiments, the solution 406 determined by the longitudinal solver module 402 is a longitudinal travel plan that includes a sequence of vehicle velocities and accelerations discretized in time. In this regard, the current vehicle velocity and/or previously planned velocity may be utilized to correlate between spatial locations from the planned lateral path 408 and points in time in the future.

The pitch-independent longitudinal constraints 416 may include, for example, longitudinal vehicle constraints that characterize or otherwise define the kinematic or physical capabilities of the vehicle for longitudinal movement, such as, for example, vehicle velocity extrema or a vehicle velocity range, vehicle acceleration extrema or a vehicle acceleration range, a speed limit associated with the roadway, following distances or buffers between objects or obstacles, such as, for example, a minimum and/or maximum following distance for other vehicles, a minimum buffer or separation distance between objects or obstacles, and the like. One or more of the longitudinal vehicle constraint data 416 may be specific to each particular vehicle and may be obtained from an onboard data storage element 32 or from a networked database or other entity 48, 52, 54. In some embodiments, the one or more of the longitudinal vehicle constraints 416 may be calculated or otherwise determined dynamically or substantially in real-time based on the current mass of the vehicle, the current amount of fuel onboard the vehicle, historical or recent performance of the vehicle, and/or potentially other factors.

The illustrated motion planning module 400 includes a pitch adjustment module 450 (which in some embodiments may be integrated with or implemented as part of the longitudinal solver module 402) that calculates or otherwise determines one or more pitch-adjusted or pitch-compensated longitudinal constraints at various points in time along the lateral path 408 based on the correlation between spatial locations and time. The pitch adjustment module 450 obtains the spatial information from the lateral path 408 and then utilizes the spatial information to retrieve or otherwise obtain elevation and/or pitch data 420 associated with locations along the lateral path 408 from a map database. The map database may be maintained onboard the vehicle (e.g., onboard data storage element 32), or alternatively, the elevation and/or pitch data 420 may be obtained via a network from an online database, a remote system (e.g., remote transportation system 52), a user device (e.g., user device 54), or another entity 48.

In some embodiments, the pitch adjustment module 450 queries the map database using the planned coordinate locations for the vehicle from the lateral path 408 to obtain pitch data 420 associated those planned coordinate locations along the lateral path 408. For example, the map database may include surveyed elevation or pitch data along the roadway on which the vehicle is traveling at locations corresponding to the coordinate locations. In other embodiments, the map database includes lower resolution surveyed elevation or pitch data along the roadway on which the vehicle is traveling at relatively fewer locations, which, in turn is interpolated or extrapolated to obtain elevation and pitch data for the coordinate locations along the lateral path 408. In other yet embodiments, the map database may include surveyed elevation data for a geographic region that is independent of roadways, which, in turn, is interpolated or extrapolated to obtain estimated elevation data along the lateral path 408 from which roadway pitch can be calculated or otherwise determined.

After the pitch adjustment module 450 obtains or determines the roadway pitch at the coordinate locations along the lateral path, the pitch adjustment module 450 calculates or otherwise determines longitudinal vehicle constraints at those coordinate locations that account for the roadway pitch associated with those coordinate locations. For example, for each coordinate location, the pitch adjustment module 450 may calculate or otherwise determine one or more of a velocity limit that accounts for the influence of the roadway pitch on sensing capabilities at that location, a velocity limit that accounts for vertical acceleration limits or passenger comfort at that location, and/or pitch-adjusted acceleration limits that account for gravitational forces at that location. Thereafter, the pitch adjustment module 450 may correlate or otherwise convert the pitch-adjusted velocity and acceleration constraints from the spatial domain to the time domain using the correlation between spatial locations from the planned lateral path 408 and points in time in the future based on the current vehicle velocity and/or previously planned vehicle velocity in the future, as described above.

As described above and in greater detail below, the longitudinal solver module 402 determines a solution 406 for traveling along the planned lateral path 408 within a longitudinal prediction horizon that complies with longitudinal constraints 416, 418 by optimizing a cost variable (or a combination thereof) by varying the longitudinal position, vehicle velocity, and vehicle acceleration at various points in time. For example, as described above, the longitudinal solver module 402 may attempt to minimize travel time, minimize fuel consumption, or achieve some optimal combination of travel time, fuel consumption, obstacle separation distances, and potentially other variables, and the cost variable (or combination thereof) sought to be optimized by the longitudinal solver module 402 may be the same as or different from the cost variable(s) optimized by the lateral solver module 404. At points within the longitudinal prediction horizon where the pitch-based constraints 418 limits the vehicle velocity or influences the vehicle acceleration capabilities, the longitudinal solver module 402 limits or adjusts the vehicle velocity or acceleration at that point within the longitudinal plan 406 accordingly, resulting in a longitudinal travel plan 406 that accounts for roadway pitch along the lateral path 408.

In one or more embodiments, the motion planning module 400 performs one or more iterations until a desired amount of convergence occurs between the lateral travel plan 408 and the longitudinal travel plan 406. For example, after the longitudinal solver module 402 determines an initial longitudinal travel plan 406 based on the initial lateral travel plan 408 determined based on the current vehicle pose 410 and/or a preceding velocity plan, the initial longitudinal travel plan 406 may be fed back to the lateral solver module 404 for determining an updated lateral travel plan 408 using the initial longitudinal travel plan 406 in lieu of the current vehicle pose 410 and/or the preceding velocity plan. Thus, the updated lateral travel plan 408 may be re-optimized based on the longitudinal travel plan 406. Thereafter, the longitudinal solver module 402 may determine an updated longitudinal travel plan 406 based on the updated lateral travel plan 408, and so on, until the plans 406, 408 converge.

The resulting longitudinal travel plan 406 output by the motion planning module 400 includes a sequence of planned longitudinal positions, velocities and accelerations for operating the vehicle within the longitudinal prediction horizon (e.g., the next 12 seconds), while the resulting lateral travel plan 408 output by the motion planning module 400 includes a sequence of planned coordinate locations, headings, and curvatures for steering the vehicle within the prediction horizon while operating in accordance with the longitudinal travel plan 406. The longitudinal and lateral plan outputs 406, 408 may be provided to a lower level control module which utilizes vehicle localization information and employs its own control schemes to generate control outputs that regulate the vehicle localization information to the longitudinal and lateral plans 406, 408 by varying throttle and steering commands provided to the actuators 30, thereby varying the velocity, acceleration, and steering of the vehicle 10 to emulate or otherwise effectuate the longitudinal and lateral plans 406, 408.

Figure 5:
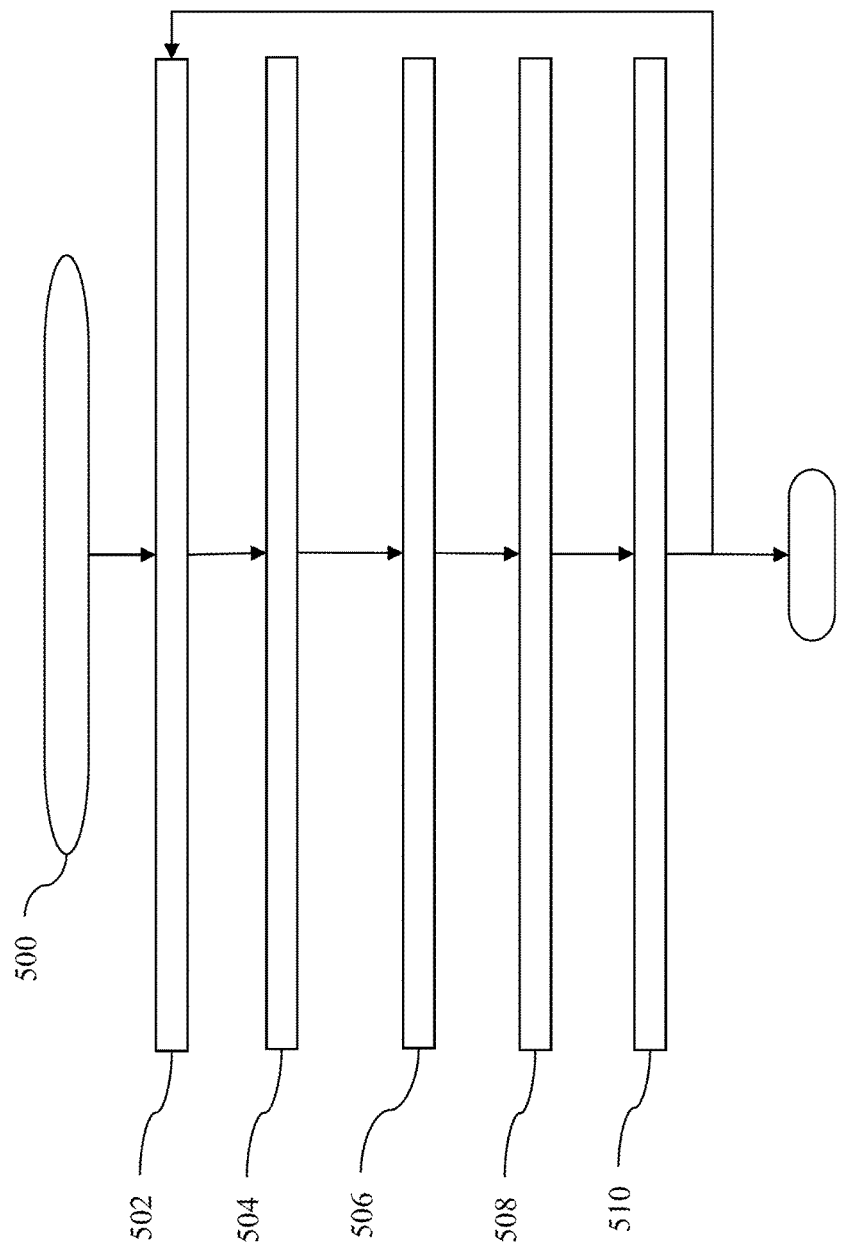
FIG. 5 is a flowchart illustrating a pitch-compensated control process for controlling the autonomous vehicle of FIG. 1, in accordance with one or more exemplary embodiments.

Referring now to FIG. 5, and with continued reference to FIGS. 1-4, a dataflow diagram illustrates various embodiments of a pitch-compensated control process 500 which may be embedded within a controller 34 in the ride control system 100 of FIG. 1 supporting the ADS 70 and motion planning module 400 of FIG. 4 in accordance with the present disclosure. As can be appreciated in light of the disclosure, the order of operation within the method is not limited to the sequential execution as illustrated in FIG. 5, but may be performed in one or more varying orders as applicable and in accordance with the present disclosure. In various embodiments, the control process 500 can be scheduled to run based on one or more predetermined events, and/or can run continuously during operation of the autonomous vehicle 10.

The illustrated control process 500 initializes or otherwise begins by retrieving or otherwise obtaining roadway pitch data for a portion of a route within a longitudinal prediction horizon at 502. For example, as described, the pitch adjustment module 450 uses the planned coordinates from the lateral travel plan 408 to query or otherwise receive data pertaining to the elevation or pitch of the route along those planned coordinates from a map database, which could either be onboard (e.g., onboard memory 32) or remote (e.g., entity 48). In this regard, in some embodiments, roadway pitch angles may be surveyed and the corresponding pitch angle data may stored or otherwise maintained in association with roadway coordinates in the map database. In other embodiments, the map database may store elevation data, which, in turn, is utilized by the pitch adjustment module 450 to calculate or otherwise determine corresponding roadway pitch angles based on the relationships between the elevation data and the planned lateral path coordinates. For example, elevation data may be interpolated to estimate elevations at the planned lateral path coordinates, which, in turn, may be utilized to calculate roadway pitch at each of the lateral path coordinates (e.g., based on the elevation changes at a particular lateral path coordinate relative to preceding or succeeding lateral path coordinates).

After obtaining pitch data for the planned route, the control process 500 continues by calculating or otherwise determining initial values for pitch-compensated longitudinal constraints along the planned route using the pitch data. In this regard, for each coordinate location, the control process 500 calculates or otherwise determines one or more sensor constraints at 504 based on the pitch at that coordinate location and the onboard sensor capabilities. Additionally, for each coordinate location, the control process 500 calculates or otherwise determines, based on the pitch at that coordinate location, one or more vertical acceleration constraints at 506 and one or more gravitational constraints at 508.

For example, as described above, for a given planned coordinate location (x, y) the pitch adjustment module 450 utilizes the roadway pitch associated with that location and the vertical beam width, range, field of view, and/or other performance characteristics associated with the onboard sensor(s) 28 to determine a velocity limit and/or acceleration limit based on the estimated distance ahead of the vehicle 10 corresponding to the longitudinal extent of the range of the onboard sensor(s) 28 along the planned route. The resulting velocity and/or acceleration limits for a respective coordinate location are input or otherwise provided to the longitudinal solver module 402 as a constraint to be imposed on the longitudinal travel plan at an instance in time corresponding to that respective coordinate location.

Additionally, for each planned coordinate location (x, y), the pitch adjustment module 450 utilizes the roadway pitch associated with that location and a vertical acceleration limit, the pitch adjustment module 450 calculates or otherwise determines a velocity limit that maintains the vertical acceleration of the vehicle 10 normal to the roadway surface less than or equal to the vertical acceleration limit, as described above. Depending on the embodiment, the vertical acceleration limit may be chosen based on passenger comfort, safety, physical characteristics of the vehicle (e.g., the vehicle clearance, weight, wheelbase, or the like), or some other factor. In some embodiments, the vertical acceleration limit may be configurable by a vehicle occupant or other user. The resulting velocity limit for a respective coordinate location may also be input or otherwise provided to the longitudinal solver module 402 as a constraint to be imposed on the longitudinal travel plan at an instance in time corresponding to that respective coordinate location. In this regard, it should be noted that in some embodiments, the pitch adjustment module 450 may input or otherwise provide only the more restrictive of the vertical acceleration velocity limit and the sensor velocity limit to the longitudinal solver module 402.

In exemplary embodiments, as described above, for each planned coordinate location (x, y), the pitch adjustment module 450 utilizes the roadway pitch associated with that location to adjust the range of achievable vehicle accelerations capable of being used by the longitudinal solver module 402 at that coordinate location. For example, when the pitch corresponds to an incline, the pitch adjustment module 450 shifts the range of achievable accelerations of the vehicle 10 by decreasing the magnitude of the maximum forward acceleration and increasing the magnitude of the maximum deceleration based on the gravitational acceleration component at that location. Conversely, when the pitch corresponds to a decline, the pitch adjustment module 450 shifts the range of achievable accelerations of the vehicle 10 by increasing the magnitude of the maximum forward acceleration and decreasing the magnitude of the maximum deceleration. The resulting acceleration limits at a respective coordinate location are also input or otherwise provided to the longitudinal solver module 402 as a constraint to be imposed on the longitudinal travel plan at an instance in time corresponding to that respective coordinate location.

After the pitch-compensated longitudinal constraints are determined along the planned route, the control process 500 continues by calculating or otherwise determining a longitudinal travel plan using the pitch-compensated longitudinal constraints at 510. In this regard, as described above, the pitch-compensated longitudinal constraints 418 are converted from the spatial domain to a time domain using vehicle velocity information, and then imposed on the longitudinal travel plan at those corresponding temporal locations. For example, using a previous velocity plan discretized in time, the planned distance traveled as a function of time may be determined. Then, for each unit time, the coordinate location(s) corresponding to or proximate to that distance from the current vehicle location may be utilized to determine the pitch-compensated longitudinal constraints to be imposed at that instance in time. In this regard, in some embodiments when there is not a direct one-to-one correlation between planned spatial coordinates and instances of time for which a longitudinal plan is being solved, pitch-compensated longitudinal constraints from two or more coordinate locations may be interpolated, averaged or otherwise combined to obtain a corresponding itch-compensated longitudinal constraint at a particular instance in time.

As described above, the pitch-compensated longitudinal constraints 418 are imposed by the longitudinal solver module 402 at the appropriate instances in time to limit the optimal solution at that point in time. In exemplary embodiments, the resulting planned vehicle velocity at a particular instant time is less than the vertical acceleration velocity limit and the sensor velocity limit corresponding to the planned lateral spatial coordinates where the vehicle is expected to be at that particular instant in time, and the resulting planned vehicle acceleration at that particular instant time is within the pitch-compensated achievable acceleration range. The resulting longitudinal travel plan 406 that complies with the pitch-compensated constraints may then be output by the motion planning module 400 and/or provided to the lateral solver module 404 for updating the lateral travel plan 408, which, in turn may be utilized to update the longitudinal travel plan 406 as described above. Thus, in one or more embodiments, the control process 500 repeats by retrieving or otherwise obtaining updated roadway pitch data within the longitudinal prediction horizon for the updated lateral travel plan 408 at 502, determining updated pitch-compensated longitudinal constraints 418 using the updated roadway pitch data at 504, 506, and 508, and then calculating or otherwise determining an updated longitudinal travel plan 406 using the updated pitch-compensated longitudinal constraints 418 at 510. In this regard, the preceding longitudinal travel plan 406 may be utilized to determine the planned distance traveled as a function of time for translating the updated pitch-compensated longitudinal constraints 418 to corresponding time instances in a similar manner as described above. Once the desired amount of convergence is achieved with the travel plans 406, 408, the control process 500 exits and the longitudinal and lateral travel plans 406, 408 are provided to lower level control modules for operating the vehicle actuators 30 accordingly, as described above.

As described above, in one or more embodiments, control process 500 may also retrieve or otherwise obtain roadway pitch data for a portion of a route within a longitudinal prediction horizon at 502 using one or more onboard sensing devices. In this regard, if the resolution of the map database does not provide sufficient pitch data for various locations within the longitudinal prediction horizon, one or more onboard sensors may be utilized to calculate or otherwise determine pitch data for those locations within the longitudinal prediction horizon. For example, pitch data derived using onboard sensors may be utilized to fill gaps in the pitch data derived from the map database (e.g., by substituting sensor-derived pitch data at locations lacking map-based pitch data), or pitch data derived using onboard sensors for various locations ahead of the vehicle along route the may be fused or blended with pitch data derived from the map database (e.g., by interpolating pitch data points to fill gaps within the longitudinal prediction horizon).

In one embodiment, the control process 500 may analyze the relative qualities of pitch data available from the different sources and select or otherwise which source of pitch data should be utilized or otherwise determine the manner in which pitch data from different sources should be utilized. For example, in one embodiment, the control process 500 analyzes the map-based pitch data within the longitudinal prediction horizon to determine whether the pitch data satisfies one or more criteria, such as, a resolution criterion (e.g., a threshold level of resolution) or some other accuracy metric, a temporal criterion (e.g., map-based pitch data was obtained within some threshold time period before the current time), and/or the like to ensure that the map-based pitch data is sufficiently reliable. When the map-based pitch data fails to satisfy one or more applicable quality criteria, the control process 500 analyzes the pitch data derived from onboard sensors or other onboard sources to identify which source should be utilized in lieu of or in addition to the map-based pitch data. For example, the control process 500 may identify or otherwise select the sensor-based pitch data having the best values for the applicable quality criteria for use as the pitch data source for the longitudinal prediction horizon. Thereafter, the control process 500 may utilize the sensor-based pitch data in determining pitch-compensated constraints. Again, depending on the embodiment, the sensor-based pitch data may be fused, blended, or otherwise combined with the map-based pitch data (e.g., by using the map-based data to fill gaps or blind spots in the sensor-based pitch data) to achieve pitch data with the desired resolution, timeliness, and quality within the longitudinal prediction horizon, and the subject matter described herein is not intended to be limited to any particular manner for incorporating or utilizing sensor-based pitch data to augment map-based pitch data.

It will be appreciated that the subject matter described herein allows for autonomous vehicle operation that more closely emulates a manually operated vehicle that accounts by using mapping data to account for roadway pitch. In this regard, planned vehicle velocities may be restricted at locations of varying pitch to limit the vertical acceleration experienced by vehicle occupants, reduce the likelihood of the vehicle bottoming out or experiencing undue physical stress, and the like. Additionally, when the onboard sensing capabilities are impaired or effectively have blind spots along the roadway ahead of the vehicle due to the roadway pitch, the planned vehicle velocity and/or acceleration may be restricted to reduce the likelihood of an exaggerated response (e.g., excessive deceleration or changes in steering angle) to objects or obstacles that may subsequently be detected in response to future changes in roadway pitch that restore normal sensing capabilities. Moreover, gravitational forces and their impact on the vehicle's acceleration capabilities or stopping distance may be accounted for to increase the likelihood that the resulting travel plans are physically realizable by the vehicle.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of controlling a vehicle, the method comprising:
   determining, by a controller onboard the vehicle, a lateral plan for operating the vehicle along a route;
   obtaining, by the controller, pitch data pertaining to the lateral plan;
   determining, by the controller, a longitudinal plan for operating the vehicle along the route based on the pitch data and the lateral plan, wherein the pitch data influences a planned rate of longitudinal movement of the vehicle at one or more points along the lateral plan, and wherein determining the longitudinal plan comprises:
      calculating a derivative of roadway pitch at a first point of the one or more points based on a subset of the pitch data corresponding to the first point; and
      calculating a velocity limit at the first point based on a relationship between the derivative of roadway pitch and a vertical acceleration threshold; and
   autonomously operating, by the controller, one or more actuators onboard the vehicle in accordance with the longitudinal plan.

2. The method of claim 1, wherein calculating the velocity limit comprises determining the velocity limit based at least in part on the subset of the pitch data and one or more performance characteristics associated with a sensing device onboard the vehicle.

3. The method of claim 2, wherein determining the velocity limit comprises:
   calculating an effective range of the sensing device based on the one or more performance characteristics and the subset of the pitch data; and
   determining the velocity limit based on the effective range.

4. The method of claim 3, wherein
   calculating the effective range of the sensing device comprises determining a distance of the route ahead of the vehicle at the first point that is perceptible by the sensing device based on the one or more performance characteristics and the subset of the pitch data; and
   determining the velocity limit based on the distance.

5. The method of claim 1, wherein a planned velocity of the longitudinal plan at a future time corresponding to the first point is less than or equal to the velocity limit.

6. The method of claim 1, wherein determining the longitudinal plan comprises determining an acceleration limit at the first point of the one or more points based at least in part on the subset of the pitch data corresponding to the first point.

7. The method of claim 6, wherein determining the acceleration limit comprises:
   determining a gravitational acceleration component based at least in part on the subset of the pitch data; and
   determining the acceleration limit associated with the first point based on the gravitational acceleration component.

8. The method of claim 7, wherein:
   determining the acceleration limit associated with the first point based on the gravitational acceleration component comprises adjusting a range of accelerations achievable by the vehicle at the first point based on the gravitational acceleration component, resulting in a pitch-adjusted range of acceleration values; and
   determining the longitudinal plan comprises optimizing a position of the vehicle along the route using the lateral plan and the pitch-adjusted range of acceleration values at the first point.

9. A non-transitory computer-readable medium having computer-executable instructions stored thereon that, when executed by a processor of the controller onboard the vehicle, cause the processor to perform the method of claim 1.

10. A method of controlling a vehicle, the method comprising:
    determining, by a controller onboard the vehicle, a lateral plan for operating the vehicle along a route;
    obtaining, by the controller, pitch data pertaining to the lateral plan; and
    determining a gravitational acceleration component based at least in part on a subset of the pitch data corresponding to a first point of one or more points along the lateral plan;
    increasing one of a maximum acceleration limit and a maximum deceleration limit at the first point based on the gravitational acceleration component; and
    decreasing the other of the maximum acceleration limit and the maximum deceleration limit at the first point based on the gravitational acceleration component;
    determining, by the controller, a longitudinal plan for operating the vehicle along the route based on the pitch data and the lateral plan, wherein the pitch data influences a planned rate of longitudinal movement of the vehicle at the one or more points along the lateral plan and determining the longitudinal plan comprises optimizing a position of the vehicle along the route using the lateral plan, the maximum acceleration limit at the first point, and the maximum deceleration limit at the first point at the first point after the increasing the one and the decreasing the other; and
    autonomously operating, by the controller, one or more actuators onboard the vehicle in accordance with the longitudinal plan.

11. A non-transitory computer-readable medium having computer-executable instructions stored thereon that, when executed by a processor of the controller onboard the vehicle, cause the processor to perform the method of claim 10.

12. An autonomous vehicle, comprising:
    at least one sensor that provides sensor data;
    one or more actuators onboard the vehicle; and
    a controller that, by a processor and based on the sensor data, identifies a current vehicle pose, determines object prediction data for an object based at least in part on the sensor data, determines a lateral plan for operating the vehicle along a route based at least in part on the current vehicle pose and the object prediction data, determines a longitudinal plan for operating the vehicle along the route based at least in part on the lateral plan and pitch data corresponding to the lateral plan, and autonomously operates the one or more actuators onboard the vehicle in accordance with the longitudinal plan, wherein the pitch data influences a planned rate of vehicle movement at one or more points in the future along the lateral plan and the longitudinal plan is determined by calculating a derivative of roadway pitch at a first point of the one or more points based on a subset of the pitch data corresponding to the first point and calculating a velocity limit at the first point based on a relationship between the derivative of roadway pitch and a vertical acceleration threshold.

13. The vehicle of claim 12, wherein:

the planned rate of vehicle movement at the first point of the one or more points satisfies the velocity limit at the first point.

14. The vehicle of claim 13, wherein the velocity limit is determined based at least in part on performance characteristics of the at least one sensor and the subset of the pitch data corresponding to the first point.

15. The vehicle of claim 12, wherein:

the planned rate of vehicle movement at the first point of the one or more points satisfies an acceleration limit at the first point; and the acceleration limit is determined based at least in part on the subset of the pitch data corresponding to the first point and a gravitational acceleration component at the first point.

16. The vehicle of claim 12, further comprising a data storage element to maintain the pitch data, wherein the controller obtains the pitch data from the data storage element.

17. The vehicle of claim 12, further comprising a data storage element to maintain elevation data for the route, wherein the controller obtains the elevation data from the data storage element and determines the pitch data corresponding to the lateral plan based on the elevation data.

* * * * *